US010653951B2

(12) United States Patent
Aliakseyeu et al.

(10) Patent No.: US 10,653,951 B2
(45) Date of Patent: May 19, 2020

(54) LIGHTING FOR VIDEO GAMES

(71) Applicant: SIGNIFY HOLDING B.V., Eindhoven (NL)

(72) Inventors: Dzmitry Viktorovich Aliakseyeu, Eindhoven (NL); Jonathan David Mason, Waalre (NL); Jacobus Dingenis Machiel Van Boven, Eindhoven (NL); Gerardus Wilhelmus Theodorus Van Der Heijden, Haaren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/087,129

(22) PCT Filed: Mar. 17, 2017

(86) PCT No.: PCT/EP2017/056431
§ 371 (c)(1),
(2) Date: Sep. 21, 2018

(87) PCT Pub. No.: WO2017/162539
PCT Pub. Date: Sep. 28, 2017

(65) Prior Publication Data
US 2019/0099668 A1    Apr. 4, 2019

(30) Foreign Application Priority Data

Mar. 22, 2016  (EP) ..................................... 16161716

(51) Int. Cl.
*A63F 13/28*   (2014.01)
*H05B 47/19*   (2020.01)
(Continued)

(52) U.S. Cl.
CPC ............ *A63F 13/28* (2014.09); *A63F 13/212* (2014.09); *G06F 16/48* (2019.01); *H05B 47/105* (2020.01); *H05B 47/155* (2020.01); *H05B 47/19* (2020.01)

(58) Field of Classification Search
CPC . H04N 5/00; A63F 13/28; A63F 13/50; A63F 13/53
See application file for complete search history.

(56) References Cited

U.S. PATENT DOCUMENTS 6,564,108 B1   5/2003  Makar et al.
7,764,026 B2   7/2010  Dowling et al.
(Continued)

FOREIGN PATENT DOCUMENTS

WO      0240921 A2    5/2002
WO   2015049617 A1    4/2015
WO   2017029063 A1    2/2017

*Primary Examiner* — James S. McClellan
(74) *Attorney, Agent, or Firm* — Akarsh P. Belagodu (57) ABSTRACT

A game lighting controller detects implicit triggers in the video games, each based on analysing audio and/or video content output during gameplay and/or an effect on one or more players invoked by the content. Each implicit trigger corresponds to a respective one of a set of predefined event types. Based on detecting one of these triggers in a video game, the controller identifies an event occurring within that video game as being of a certain one of the predefined event types. The controller also reads metadata specifying a classification of the video game from amongst a set of predefined classifications. Based on identifying the event as being of the particular predetermined type, and in dependence on the classification of the video game specified in the metadata, the controller controls illumination emitted by one or more luminaires to produce a lighting effect to accompany the first event during gameplay.

18 Claims, 4 Drawing Sheets

(51) Int. Cl.
*H05B 47/105* (2020.01)
*H05B 47/155* (2020.01)
*A63F 13/212* (2014.01)
*G06F 16/48* (2019.01)

(56) References Cited

U.S. PATENT DOCUMENTS

| | | | |
|---|---|---|---|
| 2004/0092311 A1* | 5/2004 | Weston | A63F 13/10 |
| | | | 463/42 |
| 2006/0058925 A1 | 3/2006 | Diederiks et al. | |
| 2010/0177247 A1 | 6/2010 | Sekulovski et al. | |
| 2013/0148020 A1* | 6/2013 | Cook | H05B 37/0272 |
| | | | 348/460 |
| 2013/0198786 A1 | 8/2013 | Cook et al. | |
| 2015/0092110 A1 | 4/2015 | Li et al. | |
| 2016/0292955 A1* | 10/2016 | Gronkowski | G07F 17/3225 |
| 2018/0117465 A1* | 5/2018 | Voris | A63F 13/52 |

\* cited by examiner

LIGHTING FOR VIDEO GAMES

CROSS-REFERENCE TO PRIOR APPLICATIONS

This application is the U.S. National Phase application under 35 U.S.C. § 371 of International Application No. PCT/EP2017/056431, filed on Mar. 17, 2017, which claims the benefit of European Patent Application No. 16161716.2, filed on Mar. 22, 2016. These applications are hereby incorporated by reference herein.

TECHNICAL FIELD

The present disclosure relates to controlling the illumination emitted by one or more luminaires (e.g. room lighting) in order to accompany a video game.

BACKGROUND

Connected lighting systems are a class of lighting systems comprising networked illumination sources, preferably connected via a wireless network so that the illumination sources are wirelessly controllable. These illumination sources can be controlled from various user interfaces, such as smartphone and tablet applications, via internet services, or via connected physical devices such as sensors and switches. The behaviour that can be assigned to a connected lighting system offers more opportunities than traditional lighting systems. For an end-user it is possible to specify how he or she wants his or her lighting system to behave. It is even possible to specify different forms of behaviour at different moments in time. In other words the user is now able to use his or her lighting system not only for illumination or atmosphere creation but as a way to support or enhance any other activities happing in the home environment or online, e.g. for entertainment, security, notifications, etc.

One of the most common usages of coloured connected lighting is to enhance people's daily activities. For instance, additional functionality now becomes possible in other domains such as smart homes and entertainment. E.g. it is known to add matching dynamic coloured light around a television to enhance the experience of watching TV and movies.

Furthermore, connected lighting can also be used to enhance the gameplay of video games (computer games) such as console games, arcade games, or games played on desktop or laptop computers. Now, with connected lighting systems becoming more commonplace in the home, these types of immersive experiences can even be obtained without the need to buy a dedicated entertainment lighting system. Further, it has become possible to not only create dynamic lighting near the TV or gaming screen but also around a user. Thus by connecting the lighting system to a gaming system, it is possible to create a more immersive and engaging gaming experience through the use of dynamic coloured lighting.

One of the challenges in this area is how to extract the necessary features from the game in order to render an accompanying light effect. In one known example, colours near the edges of the video frame are analysed and then these are used to create an effect to be rendered through the ambient lighting in the room. Another option is to provide a gaming SDK for the lighting system, which ties in with a game engine (e.g. Unity) and receives direct commands such as explosion, points earned, game over, etc., that cause control of one or more lamps or luminaires to emit a specified light effect. This requires game developers to develop specifically for the lighting system in question. I.e. the game developer has to use a scripting language to explicitly script a corresponding lighting effect into the game for every such event that may occur, to be triggered as soon as an event has occurred.

SUMMARY

In the examples above, the lighting effect is either driven by the script or by colours in the video frame without understanding the content or meaning of the media. The former can only be realised if a dedicated script is created for the game. The latter works well for non-interactive experiences like watching TV, but it is not well suited for gaming where, e.g., important events might have only little impact on the colours of the screen. The present disclosure provides technique for creating meaningful dynamic lighting effects for gaming without a need to create a dedicated script. Particularly, a light effect is automatically generated for game content based on the game's metadata combined with real-time data. For instance, there may be defined a set of parameters for a dynamic light engine that includes types of light transitions, speed of dynamics, special effects, colour palettes, etc.

According to one aspect disclosed herein, there is provided an apparatus comprising a game lighting controller for controlling illumination emitted by one or more luminaires of a lighting system to accompany video games played in an environment illuminated by the illumination from said one or more luminaires. The game lighting controller is configured to detect implicit triggers in the video games, wherein each of the implicit triggers corresponds to a respective one of a set of predefined event types. The implicit triggers are triggers which (instead of being explicitly scripted into the game) are detected based on analysing audio and/or video content output during gameplay and/or an effect on one or more players invoked by the audio and/or video content gameplay. E.g. the trigger could be a sound above a threshold loudness, or a flash above a threshold brightness, or the player's heartbeat rising above a threshold rate.

Based on detecting a first one of said implicit triggers in a first one of the video games, the lighting controller identifies a first event occurring within the first video game as being of a first one of said predefined event types. Furthermore, the lighting controller is also configured to read first metadata associated with the first video game, the first metadata specifying a classification of the first video game from amongst a set of predefined classifications. Based on said identification of the first event as being of said first identified type, and in dependence on the classification of the first video game as specified in the first metadata, the lighting controller then controls the illumination emitted by the one or more luminaires to produce a first lighting effect to accompany the first event during gameplay of the first video game.

In the case where the implicit triggers are based on a response invoked in the one or more players, one, some or all of these are preferably players located in the environment into which the illumination is being emitted.

In embodiments, the game lighting controller may be further configured to perform operations of: based on detecting a further instance of the first implicit trigger in a second one of the video games, identifying a second event occurring within the second video game as being of the first predefined event type; reading second metadata associated with the second video game, the second metadata specifying a classification of the second video game from amongst said set of predefined classifications, the classification of the second video game being different from the classification of the first video game; and based on said identification of the second event as being of the first event type, and on the classification of the second video game as specified in the second metadata being different than the classification of the first video game, controlling the illumination emitted by the one or more luminaires to produce a second lighting effect to accompany the occurrence of the second event during gameplay of the second video game, wherein the second lighting effect is visibly distinct from the first lighting effect.

In embodiments, the game lighting controller is further configured to perform operations of: based on detecting a further instance of the first implicit trigger in a third one of the video games, identifying a third event occurring within the third video game as being of the first predefined event type; reading third metadata associated with the third video game, the third metadata specifying a classification of the third video game from amongst said set of predefined classifications, the classification of the third video game being the same as the first video game; and based on said identification of the third event as being of the first event type, and on the classification of the third video game as specified in the third metadata being the same as the classification of the first video game, controlling the illumination emitted by the one or more luminaires to reproduce the first lighting effect to accompany the occurrence of the third event during gameplay of the third video game, wherein the reproduction of the first light effect to accompany the third event in the third video game is the same as the first effect as accompanying the first event in the first video game.

In embodiments, the classification is a genre. Alternatively the classification may be a title of the game (i.e. an identification of the particular game), or a series of games.

In embodiments the set of predefined event types may comprise any one or more of the following types: an explosion, gunfire, a fire, a crash between vehicles, a crash between at least one vehicle and another object, presence of an enemy, a player or players taking damage, a player or players increasing in health, a player or players inflicting damage, a player or players losing points, a player or players gaining points, a player or players reaching a finish line, a player or players completing a task, a player or players completing a level, a player or players completing a stage within a level, a player or players achieving a high score, and/or a player or players entering a certain game region (wherein the first predefined event type comprises one of said one or more event types). Events relating to a player may be detected as occurring on condition of happening to the player or one of the players playing the game in the environment into which the illumination is emitted, or to multiple such players.

In embodiments, the second lighting effect may comprise any one or more of: a higher intensity than the first lighting effect, a different colour than the first lighting effect, a faster speed of flashing or pulsing than the first lighting effect, a longer duration than the first lighting effect, a less uniform spatial pattern than the first lighting effect, use of a greater number of the luminaires than the first lighting effect, and/or an effect beginning earlier or later than the first lighting effect.

In embodiments, the game lighting controller may be configured to read the first, second and/or third metadata from a game file of the first, second and/or third video game, respectively. Alternatively or additionally, the game lighting controller may be configured to read the first, second and/or third metadata from a user input.

In embodiments, the game lighting controller may be configured to perform said analysis of the audio and/or video content based on: using a camera or other light sensor to detect the video content as output from a screen, reading the video content from a payload of a video data stream, using a microphone to detect the audio content as output from one or more speakers, and/or reading the audio content from a payload of an audio data stream.

In embodiments, the game lighting controller may be configured to perform said analysis in real-time as the audio and/or video content is being output during gameplay.

In embodiments, the game lighting controller may be configured to perform said detection of one or more of the implicit triggers, including at least the first trigger, at least based on analysing the audio content during gameplay.

In embodiments, the game lighting controller may be configured to perform said detection of one or more of the implicit triggers, including at least the first trigger, at least based on analysing the video content during gameplay.

In embodiments, the game lighting controller may be configured to perform said detection of one or more of the implicit triggers, including at least the first trigger, at least based on analysing a biometric effect of the audio and/or video content on the player during gameplay, wherein the biometric effect comprises one or more of: a heartrate of at least one of the one or more players, an amount of perspiration excreted by at least one of the one or more players, and/or an external temperature of at least one of the one or more players or amount of heat given off by at least one of the one or more players. E.g. where the biometric effect comprises the player's heartrate, the trigger could be based on the measured value of the heartrate directly (e.g. an event is defined as occurring when the heartrate exceeds a certain predetermined threshold) or could be based on a measure derived from heartrate, e.g. a measure of the variability of the heartrate.

In embodiments, the game lighting controller may be configured to perform said detection of one or more of the implicit triggers, including at least the first trigger, at least based on detecting an involuntary response of at least one of the one or more players to the audio and/or video content on the player during gameplay, e.g. wherein the response may comprises an audible exclamation emitted vocally by at least one of the one or more players (which may be detected using one or more microphones), and/or wherein the response may comprise at least one of the one or more players being made to jump by a surprising event in the audio and/or video content (e.g. which may be detected using one or more motion sensors such as an accelerometer, e.g. in wearable form and/or embedded in a handheld game controller being used to play the game).

In further embodiments, the game lighting controller is configured to determine priority assigned to each of the event types (e.g. by looking up the priority levels in database storing the definitions of the events); such that if a plurality of events are identified as occurring within a window of time and the one or more luminaires are incapable of rendering lighting effects to accompany all of the plurality of events within said window, then the game lighting controller prioritizes the rendering of the effects accompanying one or more of the plurality of events having a higher priority relative to one or more others of the plurality of events having a lower priority.

According to another aspect disclosed herein, there is provided a system comprising the lighting controller, the one or more luminaires, and video gaming equipment configured to enable the playing of the video games, the game lighting controller being operatively coupled to the video gaming equipment in order to detect the implicit triggers and read the metadata, and the game lighting controller further being operatively coupled to the luminaires in order to perform said control.

According to another aspect disclosed herein, there is provided a computer program product for controlling illumination emitted by one or more luminaires of a lighting system to accompany video games played in an environment illuminated by the illumination from said one or more luminaires; wherein the computer program product comprises code embodied on a computer-readable storage medium and configured so as when run on one or more control devices to perform operations of: detecting implicit triggers in the video games, the detection of each of the implicit triggers being based on analysing audio and/or video content output during gameplay and/or an effect on one or more players invoked by the audio and/or video content during gameplay, wherein each of the implicit triggers corresponds to a respective one of a set of predefined event types; based on detecting a first one of said implicit triggers in a first one of the video games, identifying a first event occurring within the first video game as being of a first one of said predefined event types; reading first metadata associated with the first video game, the first metadata specifying a classification of the first video game from amongst a set of predefined classifications; based on said identification of the first event as being of said first identified type, and in dependence on the classification of the first video game as specified in the first metadata, controlling the illumination emitted by the one or more luminaires to produce a first lighting effect to accompany the first event during gameplay of the first video game.

According to another aspect disclosed herein, there is provided a method of controlling illumination emitted by one or more luminaires of a lighting system to accompany video games played in an environment illuminated by the illumination from said one or more luminaires; wherein the method comprises: detecting implicit triggers in the video games, the detection of each of the implicit triggers being based on analysing audio and/or video content output during gameplay and/or an effect on one or more players invoked by the audio and/or video content during gameplay, wherein each of the implicit triggers corresponds to a respective one of a set of predefined event types; based on detecting a first one of said implicit triggers in a first one of the video games, identifying a first event occurring within the first video game as being of a first one of said predefined event types; reading first metadata associated with the first video game, the first metadata specifying a classification of the first video game from amongst a set of predefined classifications; based on said identification of the first event as being of said first identified type, and in dependence on the classification of the first video game as specified in the first metadata, controlling the illumination emitted by the one or more luminaires to produce a first lighting effect to accompany the first event during gameplay of the first video game.

In embodiments the system, computer program product and/or method may be further configured in accordance with any of the features mentioned above or described elsewhere herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following discloses a method for creating meaningful dynamic lighting effects for gaming that, unlike existing systems, does not require in-game scripting. Instead of scripting the method automatically generates light effects for a game based on the game's metadata in combination with real-time data. This involves using metadata such as the game's genre to define parameters for the light rendering engine (such as transitions, speed of dynamics, special effects, and/or colour palettes, etc.), in order to define a set of specific light effects (such as an explosion) unique for the genre or specific game; and then using a real time analysis of sound and/or on screen content during gameplay to adjust the dynamic light rendering engine parameters (within the boundaries defined by the genre).

Thus there is provided a mechanism which determines what light effect to render for accompanying a video game being played, based on (i) determining metadata such as the genre of the video game (e.g. shooter, racing game); and (ii) performing audio/video analysis of game output. What triggers are detected in the audio/video and what light effects accompany these triggers will determine the light effects that are rendered.

In embodiments, additional inputs can be used to determine the light effects, for example biometric information from the player(s). Further, audio and video analysis may be applied in parallel, with certain effects requiring dual confirmation from both the audio and video content in order to prevent false positives (e.g. a large explosion causing an intense light effect may be rendered only if both video and audio triggers are present).

Figure 1:
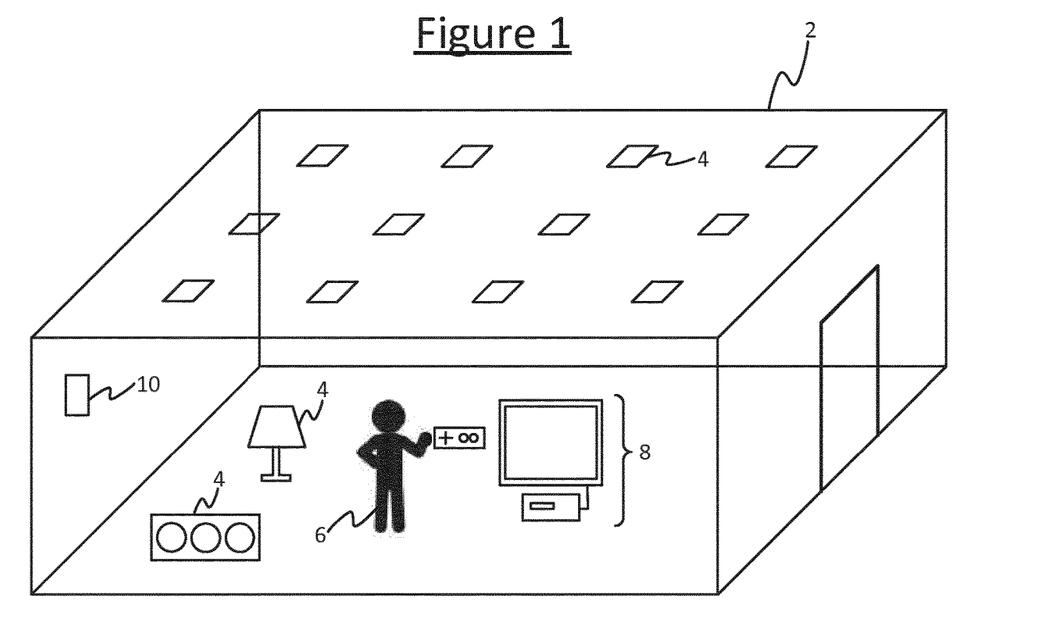
FIG. 1 is a schematic illustration of an environment in which one or more users are playing a video game.

FIG. 1 illustrates an environment 2 in which one or more players 6 are playing a video game on video gaming equipment 8, such as a games console connected to an external screen (e.g. TV screen), a desktop or laptop computer (e.g. PC), a handheld device (e.g. tablet or smartphone) or a dedicated arcade machine. Note that the environment here refers to the physical surroundings of the player(s) 6 in the real world, i.e. an actual region of physical space, as opposed to the virtual arena of the video game. The environment 2 may comprise a room such as a room of a home, or of communal leisure facility such as video game arcade (where a "room" may be any internal division of a building such as a living room, dining room, bedroom, hall, concourse, etc.). Alternatively the environment 2 may comprise an outdoor space such as a garden or park, or a partially covered space such as a gazebo.

In addition to the video gaming equipment 8 including its screen(s) and user input device(s) (e.g. joypad, mouse, gesture-base controller, etc.), the environment 2 is additionally equipped with a connected lighting system comprising one or more luminaires 4 and a lighting controller 10 connected to control the luminaires 4. The luminaires 4 are illumination sources for illuminating the environment 2 in which the game video is being played. Each luminaire 4 comprises: at least one respective lamp (e.g. LED lamp, filament bulb or fluorescent tube); a wired or wireless communication interface for communicating with the controller 10; and any associated socket support, and/or housing. Each of the luminaires 4 may take any of a variety of forms, e.g. a ceiling mounted luminaire, a wall-mounted luminaire, a wall washer, or a free-standing luminaire (and the luminaires 4 need not necessarily all be of the same kind).

The lighting controller 10 may be implemented on a dedicated lighting control unit, e.g. a lighting bridge, buildings control unit or wall-panel. Alternatively the lighting controller 10 may be implemented on any other suitable apparatus such as a general purpose user terminal, e.g. server or desktop computer or even a mobile terminal such as a laptop, tablet or smartphone. Note that a server herein refers to a logical entity that may comprise one or more server units at one or more geographical sites. As another example, some or all of the lighting controller 10 may be integrated into the gaming equipment 8 itself, or could be split between any two or more of the above devices and/or others. E.g. in yet another example, the lighting controller could be implemented partially or wholly as a distributed controller distributed amongst the luminaires 4 themselves. Wherever implemented, the lighting controller 10 may be implemented in the form of software stored on a memory of the relevant apparatus and arranged to run on a processor of that apparatus (the memory comprising one or memory devices and the processor comprising one or more processing units). Alternatively it is not excluded that the lighting controller may be implemented in the form of dedicated hardware circuitry, or configurable or reconfigurable hardware circuitry such as a PGA or FPGA, or any combination of hardware and software.

The lighting controller 10 and luminaires 4 form a lighting system, in which the lighting controller 10 and the one or more luminaires 4 are networked together into a local lighting network. That is, the lighting controller 10 is arranged to connect to each of the luminaires 4 by means of a wired or wireless connection. Preferably the local lighting network is a wireless network, with the lighting controller 10 being arranged to connect to the luminaires 4 by means of a wireless connection using a wireless access technology such as Wi-Fi, ZigBee, Bluetooth, Thread, or the like. Furthermore, the lighting controller 10 is arranged to connect to the gaming equipment 8, again by a wired or wireless connection, and preferably (at least in the case where the lighting controller 10 is external to the gaming equipment) via a wireless connection such as Wi-Fi, ZigBee, Bluetooth, Thread or the like. The gaming equipment 8 may connect to the lighting controller 10 as part of the same lighting network as the luminaires 4, or by a separate channel. The various interactions described herein between the lighting controller 10, luminaires 4 and video gaming device 8 may be conducted via any of the above means and/or others, and for brevity the means of connection will not be repeated each time.

The video gaming equipment 8 is arranged to run at least one game application, which presents the user (player) with a video game that he or she can play (or that multiple players can play). During the gameplay of the game, the player has control of at least one virtual object (sometimes referred to as a "sprite") within the game. Typically this virtual object is a character such as a person, animal or anthropomorphized object; or may also be a vehicle such as a car in a racing game, or a spaceship. The virtual object or objects could also take other forms, such tiles in a construction or empire building game. The one or more virtual objects controlled by the player during gameplay are controlled within a virtual arena, i.e. a virtual setting in which game events occur and actions are carried out in the game ("arena" being used in its general sense to mean any place in which activity is carried out). The control the player exerts during gameplay comprises moving the one or more virtual objects within the virtual arena, and/or causing the one or more virtual objects to interact with the virtual arena (e.g. talk to another character in the virtual arena, pick up an item in the virtual arena, change a parameter of some item or aspect of the virtual arena, etc.).

Figure 2:
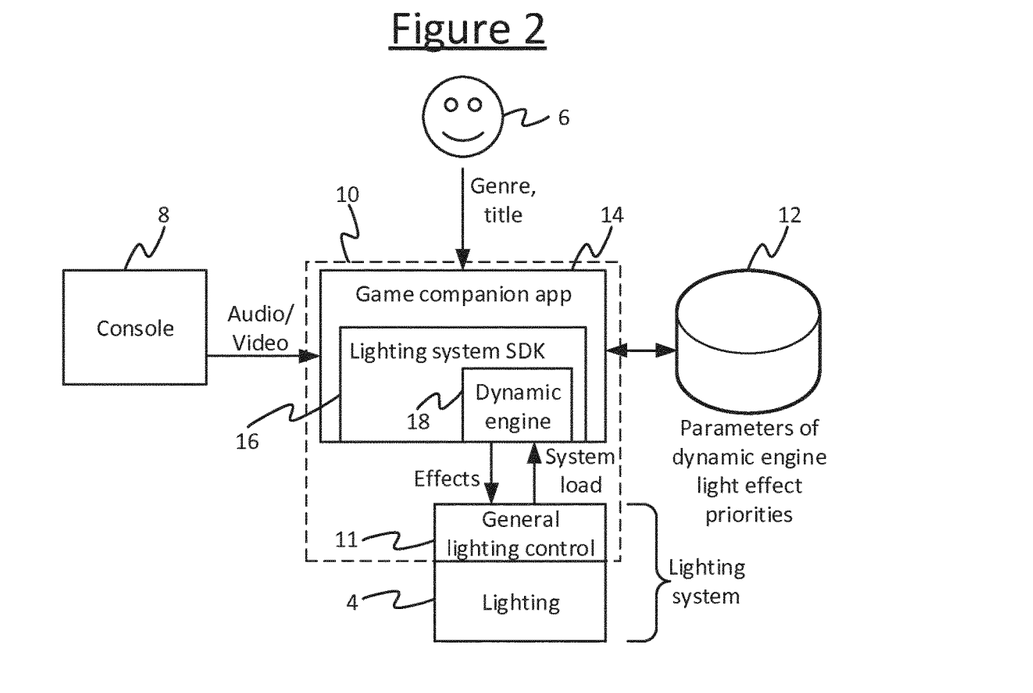
FIG. 2 is a schematic block diagram of a lighting and gaming system.

FIG. 2 shows more detail of the lighting controller 10 according to embodiments disclosed herein. The lighting controller 10 comprises a game lighting controller 14 configured to control the illumination emitted into the environment 2 by the one or more luminaires 4 in dependence on events occurring within the game currently being played, as will be discussed in more detail below. In order to be able to receive audio, video and/or any other inputs from the gaming equipment 8, the game lighting controller 14 is coupled to the game equipment via any of the wired or wireless means discussed above, or alternatively is wholly or partially implemented in the game equipment 8 itself (e.g. a games console). In embodiments, the game lighting controller 14 takes the form of a game companion application (or "app"), arranged to run on a lighting control unit, gaming equipment 8, general purpose computer device, luminaire(s) 4, or any combination of these and/or other devices; or alternatively it is not excluded that the game lighting controller 8 may be implemented in any such device or devices in the form of dedicated hardware circuitry, or configurable or reconfigurable hardware, or any combination of hardware and software.

In order to be able to control the illumination, the game lighting controller 14 is coupled to the one or more luminaires 4, optionally via a general purpose lighting control module 11. The general purpose lighting control module 11 may for example take the form of a master lighting controller configured to arbitrate between the control of the luminaire(s) 4 being requested by the game lighting controller 14 and the control requirements of any other one or more lighting control functions (not shown), e.g. where such other lighting control functions may comprise a manual override based on a user input, or a presence based control function arranged to control the lights in dependence on one or more presence sensors detecting a person or people in the environment 2. The general lighting controller 11 may be implemented in a dedicated lighting control unit, or a server, or a user terminal, or may be distributed amongst the luminaires 4, or may be implemented in any combination of these and/or other devices. It may be implemented in the form of software arranged to run on the relevant device or devices, or in the form of dedicated hardware circuitry, or configurable or reconfigurable hardware circuitry, or any combination of these.

According to one perspective, the general purpose lightning controller 11 and luminaire(s) 4 may be described as forming the lighting system and the gaming equipment 8 (including any screen, speakers and/or game controller(s)) may be considered as the gaming system, with the game light controller 8 arranged as an interface between the two in order to form the overall system.

In embodiments, both the game lighting controller 14 and general purpose lighting controller 11 may be implemented together on the same device, e.g. on a dedicated lighting control unit such as a lighting bridge, buildings controller or wall-panel; or together on some other centralized lighting control apparatus such as on the same server. In this case, to implement the various communications involved in the functionality discussed herein, the game lighting controller 14 may be coupled to the general lighting controller 11 via an internal connection, whilst the game lighting controller 14 is arranged to communicate with the game running on the gaming equipment 8 via any of the wired or wireless means discussed above, and the general lighting controller 11 is arranged to communicate with the luminaire(s) 4 via any of the wired or wireless means discussed above (and the connection between the game lighting controller 14 and gaming equipment 8 may be via the same means or a different means as the connection between the general lighting control 11 and the luminaire(s) 4, e.g. all via the same wireless network of via two different respective networks). As an alternative example, the general lighting controller 11 may be implemented on the dedicated or centralized lighting control unit whilst the game lighting controller 14 may be implemented on the game equipment 8 (e.g. installed on or embedded in a games console, or installed on a desktop or laptop computer on which the game is played). In this case, to implement the various communications involved in the functionality discussed herein, the game lighting controller 8 may be arranged to communicate with the game via an internal connection, whilst being arranged to communicate with the general lighting controller on the lighting control unit, terminal or server via any of the wired or wireless means discussed above.

The game lighting controller 14 is configured to recognise a set of predefined types of event that can occur during video games. That is, the game lighting controller 14 comprises a database 12 listing a set of the different predefined event types. Alternatively the database 12 could be stored elsewhere, e.g. on a server, and accessed by the lighting controller 10 over a network such as the Internet (via any of the wired or wireless communications means discussed above and/or others). For instance the database 12 may be maintained centrally on a server hosted on the Internet, and the lighting controller 10 may be configured to download an instance of the database (or a portion of it) from the server 12 via the Internet. Note again that a server herein refers to a logical entity that may comprise one or more server units at one or more geographical sites.

A non-exhaustive list of possible types of event that may occur in a video game is as follows, and in embodiments the set of predefined event types recognized by the lighting controller may comprise any one or more of these: an explosion, a gunshot, a fire, a crash between vehicles, a crash between at least one vehicle and another object (e.g. its surroundings in the video game), presence of an enemy, a player taking damage, a player increasing in health, a player inflicting damage, a player losing points, a player gaining points, a player reaching a finish line, a player completing a task, a player completing a level, a player completing a stage within a level, a player achieving a high score, and/or a player entering a new area of the game. Events relating to player could also occur on condition of happening to multiple players if the game is a multiplayer game.

The database 12 stored at (or accessed by) the game lighting controller 14 defines a respective event trigger for each of the event types. The event trigger is a definition of one or more criteria that have to be detected by the game lighting controller 14 in order to declare a positive occurrence of an event of the respective event type. According to the present disclosure, each of the triggers is an implicit trigger. That is to say, the video game does not contain any explicitly scripted lighting effects or explicitly scripted lighting effect triggers explicitly coded into the game itself. Instead, each trigger in the database 12 is defined in terms of one or more criteria that can be detected by the game lighting controller 14 based on the audio and/or video content of the game (i.e. the audio and/or video payload, as opposed to metadata accompanying the audio and/or video). For instance, an event such as an explosion may defined as occurring on condition of one or more of the following: (a) the volume of the game audio exceeds a certain predefined threshold (optionally for at least a certain predefined window of time); and/or (b) a certain audio pattern is recognized in the game audio; and/or (c) a brightness in the game video, or and amplitude on a certain colour channel, exceeds a certain predefined threshold (optionally for at least a certain predefined window of time and/or over a certain minimum screen area); and/or (d) a certain graphical pattern is recognized in the game video. In embodiments, a combination of both at least one audio criterion and at least one video criterion may be required to recognize a given event. This advantageously reduces false positives.

Alternatively or additionally, each of one or more of the triggers in the database 12 may be defined in terms of one or more criteria that can be detected by the game lighting controller 14 based on an input from one or more peripherals (not shown). E.g. these could be one or more peripherals forming part of the game equipment 8 and arranged to supply their inputs to the game lighting controller 14 via the game equipment 8. For instance, the peripheral(s) may comprise one or more biometric sensors arranged to sense biometric information from at least one of the one or more players playing the game in the environment 2, e.g. being worn about their person. For instance the biometric sensor(s) may comprise a heart rate monitor, a perspiration sensor, and/or a heat or temperature sensor for measuring the heat given off by the player. For instance one or more such sensors could be integrated in a handheld game controller being used by the player in question to play the game, or a wearable device worn may that player. E.g. a heartrate sensor in the form a pulse sensor to measure the player's pulse from one or more fingers or thumbs, or a perspiration sensor in the form a galvanic sensor to measure amount of perspiration based on galvanic skin response, may be incorporated into the game controller. Biometric factors such as heartrate or perspiration are related to peoples' emotional state. Hence based on one or more biometric sensors such as those as mentioned above, an event such as the player entering a scary part of the game may defined as occurring on condition of one or more of the following: (e) the player's heartrate exceeding a predetermine threshold, (f) a measure of variability in the heartrate of the user exceeding a certain predetermined threshold, (g) the player perspiring beyond a threshold amount, (h) the player's skin temperature exceeding a certain predefined threshold, and/or (i) the rate of heat given off by the player exceeding a threshold. In embodiments a given event may require a combination of two or more of these criteria, and/or a combination of one or more such criteria and one or more audio and/or video criteria, in order to declare a positive occurrence of the respective event. Again this advantageously reduces the chance of false positives.

As another alternative or additional example, the peripherals may comprise one or more motion sensors arranged to detect motion of one or more players of the game. E.g. this/these may take the form of one or more wearable inertial sensors such as one or more wearable gyroscopes and/or accelerometers; and/or one or more inertial sensors such as one or more gyroscopes and/or accelerometers incorporated into a handheld controller being used by the player(s) to play the game; and/or an external motion sensing system based on a motion-based presence sensing technology such as radar, active ultrasound or passive infrared sensing. Whatever form the motion sensor(s) take, a trigger may be defined in the database in terms of motion of the player. E.g. a certain event such as a sudden shock in the game may be defined as occurring on condition of one or more of the following: (j) the player's motion exceeds a certain predefined threshold displacement, (k) the player's motion exceeds a certain predefined threshold speed, (l) the player's motion exceeds a certain predefined threshold acceleration, (m) the player's exhibits motion in a certain predefined direction, and/or (n) the player exhibits motion matching a certain predefined pattern. Again a given event may be defined in terms of any one of these, or any combination of two or more of these, and/or any combination of any of the other tests (a)-(i) above.

As another alternative or additional example, the peripherals may comprise one or more microphones arranged to detect vocal activity from one or more players of the game being played. In this case a certain event such as a sudden shock in the game may be defined as occurring on condition of one or more of the following: (o) the volume of the player's voice exceeding a certain predefined threshold, and/or (p) the player's voice matching a certain predefined pattern (e.g. word or phrase). Again a given event may be defined in terms of any one or both of these, or any combination of either or both of these with any one or more of the other tests (a)-(n) above.

As another alternative or additional example, an implicit trigger may be defined in terms of (r) a certain implicit response of the user detected through the buttons of the game controller. Apart from the deliberate, explicit actions performed by the player(s) using the game controller, the game controller can also be used to measure one or more implicit aspects of how the game is played; e.g. detecting button mashing can be used to estimate the stress level. A given event may defined in terms of any one or more such aspects, or any combination of one or more such aspects with any one or more of the other tests (a)-(p) above.

In addition to the trigger definitions, the database 12 stored at (or accessed by) the lighting controller 14 also comprises a definition of a respective lighting effect mapped to each of a plurality of the different event types (and therefore to be triggered by the respective trigger for the respective event type). Each lighting effect may be defined in terms of any one or more of: a particular colour of lighting; a particular intensity of lighting; a particular spatial pattern of lighting to be rendered over a plurality of luminaires 4; a start time, duration and/or end time of the effect; and/or a dynamic lighting pattern (e.g. flashing or pulsing, perhaps specifying a particular speed and/or depth of variation, or a time-varying spatial pattern).

Furthermore, for each of the triggers, the database 12 in fact stores a definition of a respective plurality of different lighting effects, one for each of a plurality of different values of at least one item of metadata that can be associated with a video game. That is, for each trigger definition and metadata value combination, there is a unique lighting effect mapped to that pairing of trigger definition and metadata value. The metadata is data that can be associated with a video game in order to describe that video game, and particularly for the purpose of the present disclosure, to categorize it. In one preferred embodiment disclosed herein, the metadata comprises at least an indication of a genre of the game (e.g. shoot-'em-up, flight simulator, strategy, sports, driving game, etc.). Thus for each trigger definition in the database, there is a different lighting effect mapped to that trigger for each of a plurality of genres. For instance if the trigger is an explosion (such as to be recognize by the light and sound levels in the video and audio respectively), there may one lighting effect mapped to that trigger for a shooting game and another, different lighting effect mapped to that same trigger for a driving game.

As another example of metadata, the metadata may comprise an indication of a title of the game, i.e. which individual game is being played. Note that where the metadata specifies title, this doesn't necessarily mean in terms of a text string spelling out the name of the game. E.g. the metadata could take the form of a numerical or alphanumerical ID code that identifies the game—basically anything that identifies the particular game being played. In such cases, then for each of the triggers defined in the database 12, a different lighting effect is mapped to that trigger for each of a plurality of different possible game titles. Another example of metadata is an indication of a series of games, e.g. with a particular title and its sequels forming a series. In this case, for each trigger, the database 12 would specify a different respective lighting effect mapped to that trigger for each of a plurality of different game series.

The lighting controller 14 comprises a dynamic engine 18 configured to monitor the audio and/or video of the game currently being played on the gaming equipment 8, and/or to monitor the input data from the one or more peripherals (e.g. the voice data as captured by the microphone, and/or the motion data from the one or more motion sensors, and/or the biometric information captured by the one or more biometric sensors). In the case of monitoring the audio and/or video content, this may be achieved by monitoring the payload data from the audio and/or video stream (respectively) as output by the game from the gaming equipment 8. In this case, as well as outputting the current audio and/or video content of the game via the speaker(s) and/or screen (respectively) of the gaming equipment 8, the game equipment 8 is also arranged to supply in real-time a copy of the audio and/or video content (i.e. the actual payload data) of the audio and/or video stream(s), respectively, to the game lighting controller 14 where it is analysed in real-time to check for any of the implicit triggers. In an alternative or additional variant of this, the game lighting controller 14 may be arranged to monitor the content of the game audio via one or more microphones disposed in the environment 2, and/or to monitor the content of the game video via one or more cameras or other light sensors disposed in the environment 2. In such cases, it is not necessary for any special interface to be provided between the gaming equipment 8 and the lighting controller 10.

Based on said monitoring (whatever form it takes), the dynamic engine 18 is configured to detect when any of the triggers defined in the event database 12 occur in the game currently being played. This monitoring and detection is performed in real-time, i.e. "on the fly" as-and-when then events occur.

Further, at some point the game lighting controller 14 also reads the metadata associated with the current game in order to determine the classification of the game currently being played, e.g. to determine its genre, or its series, or which particular title it is. The metadata could be read just once at the beginning of the game, or in an ongoing fashion, or in response to certain events (e.g. when the player starts a new level or sub-game). The metadata may be read from a game file of the game or from a stream of game data (e.g. in the case of an online game). Alternatively the metadata could be input manually by the player 6 via a suitable input peripheral such as keyboard, mouse, trackpad, joypad, joystick or microphone plus voice recognition.

When any of the implicit triggers defined in the database 12 is detected to occur during the gameplay, then the dynamic engine 18 of the game lighting controller 14 responds in real time, as-and-when the corresponding event happens, by looking up the lighting effect mapped to the respective event type and the current game classification in the database 12, and based thereon controlling the luminaire(s) 4 to render the corresponding lighting effect to accompany the event. This may involve controlling any one or more of a number of lighting parameters that may be specified in the database 12 to define the lighting effect, e.g. defining transitions, speed of dynamics, special effects, colour palettes, or the like.

In embodiments, part or all of the dynamic engine 18 and/or one or more other elements of the game lighting controller 14 may take the form of components 16 derived from a software development kit (SDK). The SDK may be provided by a provider of the lighting system in order to aid a developer of the game or a provider of the gaming equipment 8 to develop lighting effects to accompany their games. Alternatively, the SDK may be provided by a developer of the game or provider of the gaming system 8 to aid a provider of the lighting system to provide lighting effects to accompany their games. Alternatively the dynamic engine 18 and/or one or more other elements of the game lighting controller need not take the form of components 16 derived from an SDK.

Note that, in accordance with embodiments disclosed herein, whenever one of the predefined types of event of occurs during the gameplay of a game with a first classification (e.g. first genre), then as specified in the database 12 the game lighting controller 14 will control the lighting 4 to render a first lighting effect mapped to the combination of the event type and first classification; but when the same type of event is detected to occur in another game with a second classification (e.g. second genre) different to the first, then the database 12 will cause the game lighting controller 14 to control the lighting 4 to render a second, different lighting effect to accompany the same event type.

Figure 3:
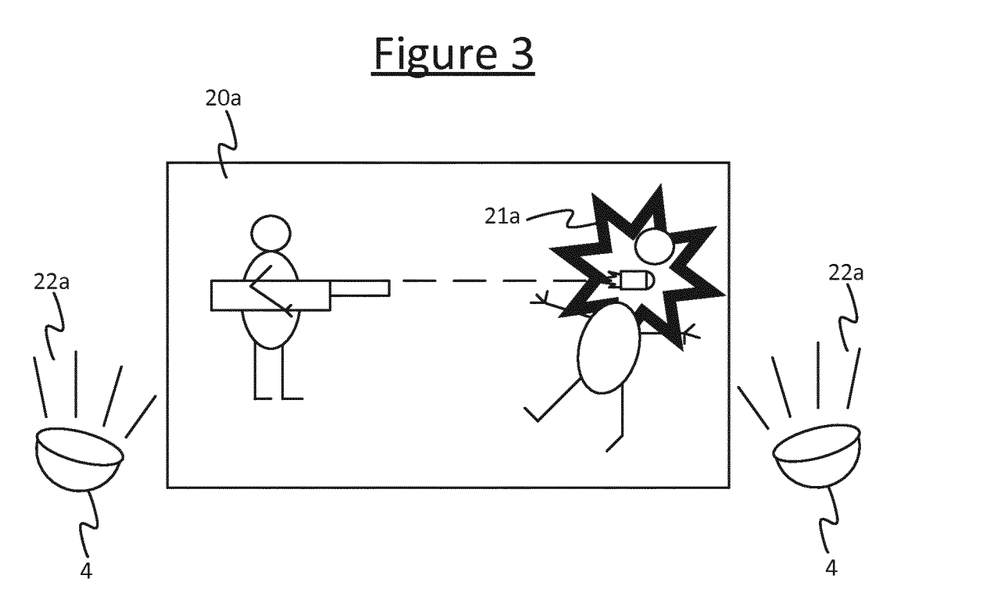
FIG. 3 is a schematic illustration of a lighting effect accompanying an explosion event during playing of a shooting game.
Figure 4:
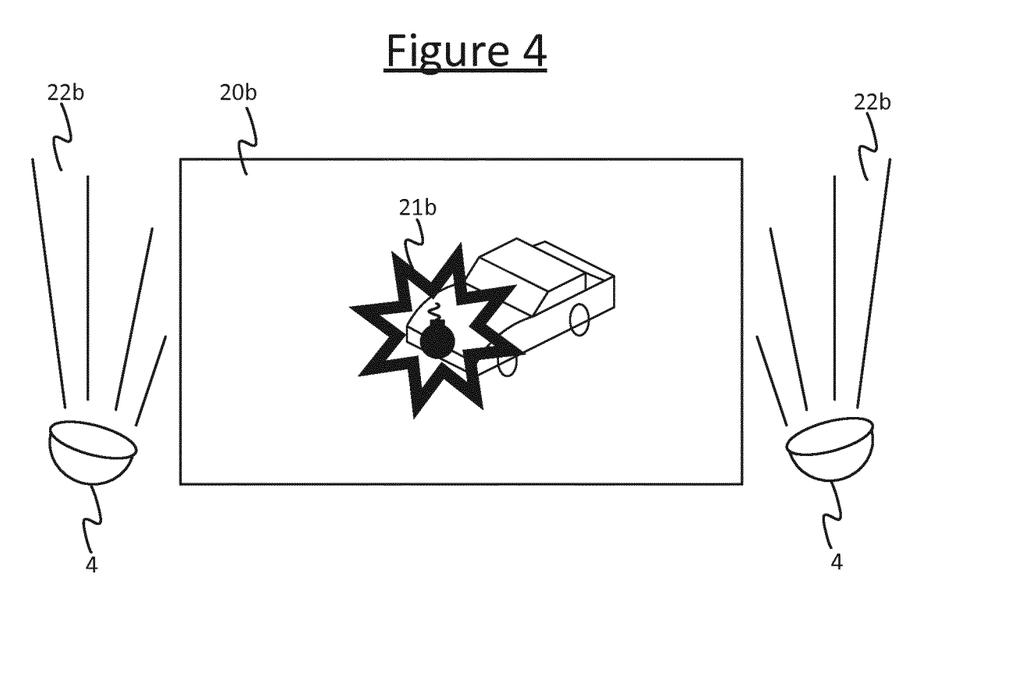
FIG. 4 is a schematic illustration of a lighting effect accompanying an explosion event in a driving game.

An example is illustrated in FIGS. 3 and 4. Note that while the luminaires 4 are shown next to the screen in FIGS. 3 and 4, this is only intended to be schematic and the luminaires 4 could be located anywhere in the environment 2.

FIG. 3 shows a first instance 21a of an event of a given category, in this case an in-game explosion, occurring in a first computer game 21a of a first genre, in this case a shooting game. The event is detected as being in the category "Explosion" by the dynamic engine 18 of the game lighting controller 14 based on the audio and/or video content of the game, and/or the user's reaction to this content. The game lighting controller 14 combines this information with the genre metadata in order to look up the parameters of a first lighting effect 22a in the game lighting database, and to render this first lighting effect 22a via one or more of the luminaires 4. FIG. 4 shows a second instance 21b of an event in the same category of event, in this case again an in-game explosion, occurring in a second computer game 21b of a second genre, in this case a driving game. The event is again detected as being in the category "Explosion" by the dynamic engine 18 of the game lighting controller 14 based on the audio and/or video content of the game, and/or the user's reaction to this content. The game lighting controller 14 combines this information with the (different) genre metadata in order to look up the parameters of a second lighting effect 22b in the game lighting database, and to render this second lighting effect 22b via one or more of the luminaires 4. For example the second lighting effect 22b could be brighter, longer in duration and/or or a different colour or sequence of colours compared to the first effect 22a. This the metadata differentiates between different occurrences of the same event type (from amongst a discrete set of predefined event types) occurring in different games of a different classification, e.g. different genre or series.

Thus according to everything discussed above, there is disclosed a game lighting controller 14 configured to infer the triggers from the game content, or the player's response to the content, and to categorize these inferences into discrete categories of event, then make the interpretation of that category (in terms of lighting effect) a function of the metadata associated with the game (e.g. title, series or genre of the game).

For each game genre (or series or specific game), pre-set values are defined for the light dynamics parameters. Based on the real time analysis of sound and/or on screen content during gameplay, the dynamic engine's parameters are then adjusted (within the boundaries defined by the genre). Based on real time analysis of sound and/or on screen content during gameplay, this can trigger special effects. The frequency and how the type effects are rendered are defined by the genre and the current lighting system's state and it's performance; for example every loud sound in a 3D shooting game will not be rendered as an explosion, perhaps due to the lighting system's limitations and frequency of these events, while with a car racing game, any very loud sound (e.g. a crash) can be rendered as an explosion since these are not very frequent events.

As discussed, for each genre (or series or specific game), there is defined a set of light effects including, for each effect, the effect itself and a trigger mechanism (e.g. based on the specific audio trigger such as sound of explosion). Each effect may be pre-defined in terms of colour palette, type of colour transitions, and/or speed of transitions and/or any one or more other lighting parameters.

The table below gives some examples of effects and their triggers.

| Light effect | Audio trigger |
| --- | --- |
| Explosion | Sudden change in loudness exceeding a predefined threshold |
| Gun fire | A series of a sudden loudness changes |
| Heartbeat | Depending on the type of the game, the sound of the heartbeat can be detected or a specific sound (e.g. in horror games) |
| Light flashing | Depends on the type of the game, e.g. if the sound of accelerating car is detected in the racing game |

In addition to (or as an alternative to) the audio, screen capturing could be added to the system. For example this can be used to adjust a palette for the ambiance and select colours for specific light effects.

Furthermore, in embodiments the database 12 may also define priorities for the effects and ambiance, in order to define system behaviour when lighting system is not capable of rendering all incoming commands. The lighting rendering system can have limitations on how many or how frequently it can render specific light effect. For example it may only be possible to send a command to all lights 4 only once per second. So if the light controller detects five explosions happening in one second it can safely only render one. To address this, the database 12 may define what effects have priority if such a situation occurs. The priorities may also be defined by the type of the game, for example in the shooter with a lot of explosions and gunfire, an explosion might have higher priority than gunfire; while in a game where shooting is very rare but serves an important part of the game atmosphere, the shooting effect might have the highest priority.

In further embodiments, the light engine 14 may also look to the game's metadata for the type of game as input for the ambient lighting set up, not only the action effects. For example a platform game may be weighted more towards a more intense ambient light set up whereas a shooter or racing game may lower the ambient lighting in preparation for the special effects to make them more impactful.

In yet further embodiments, real time data may also come from the peripheral devices connected to the game console or system 8, such as the smart device. Depending on the genre, how the light engine 18 interprets these data will vary. For example, loud sounds from people in the room during a platform game or gesture-based sports game may work well with a bright, colourful and dynamic lighting that fits the game, whereas silence and high heartrate sensed from a person playing a shooter may need darkness to help concentrate.

In embodiments no integration with the game or a gaming console 8 is required. The dynamic engine 18 can instead be integrated into a component of the lighting system, e.g. a lighting bridge, in order to generate the dynamic ambiance. A dedicated light control app 14 can be used to first allow a user to enter information about the game, secondly listen to the audio during the gameplay game itself, and finally to control the lighting with the help of dynamic engine 18.

Alternatively the app 14 can be natively integrated into the console 8, so that the audio and/or video stream can be read directly. Such implementation remove the need for an additional device to run the application and would improve the robustness of the system.

For an example scenario refer again to FIG. 2. Here the game companion app 14 gets input from the microphone (game audio), and a user input of game genre or title from the user 6. The game genre and/or title is used to request lighting parameters associated with it from the database 12, which can either be part of the application itself or located in the cloud, system load from the lighting system and based on that send the command to the lighting system 4, 11 to render the light effects and ambiance. The dynamic engine 18 is depicted as to be a part of the companion app 14 or SDK 16, but can also be implemented as a part of the lighting system 4, 11 (e.g. located on a lighting ridge). The system load indicated in FIG. 2 as being signalled from the general lighting controller 11 to the game lighting controller 14 refers to an indication of what amount of the lighting system's 4, 10 finite capacity to render lighting effects is already consumed, as discussed above. E.g. the lighting system 4, 11 may be able to tell to the game lighting controller 14 (e.g. integrated in the game application) something along the lines of: "I'm overloaded cannot render any additional effect in the upcoming t milliseconds" (e.g. where x is 100). So then the lighting controller 14 may need to decide which effect it should render and which it should drop.

Note: embodiments above has been described in terms of the triggers being defined based on effects on at least one of the one or more players who are playing the game in the same environment 2 as that into which the controlled illumination is being emitted. However the idea can also be extended to a case of multiplayer games where the some or all of the multiple players are co-located in the environment 2 into which the controlled illumination is emitted (e.g. a sports game in which multiple users use gesture-based controllers to compete at sports in the same room); or even in which some of the multiple platers are remote players not located in said environment 2, but instead playing the game from a remote terminal connecting to the games equipment via a network such as the Internet (e.g. a "Massively Multiplayer Online Game", or MMOG, such as a fantasy role playing game). In such cases, a given type of trigger may for example be defined as occurring when the effect of the game on multiple of the players playing the game locally in the environment 2 meets some condition (e.g. each user's heartrate or variability of heartrate increases beyond a threshold), or even when the effect of the game one or more of the remote users meets a certain condition (e.g. each of the remote user's or users' heartrate or variability of heartrate increases beyond a threshold), or when the effect of the game on a combination of the local and remote users meets a certain condition). Note that in the case of taking into account information such as biometric information from a remote user, then this may be shared with the game lighting controller 14 from the remote terminal via a network such as the Internet.

Figure 2A:
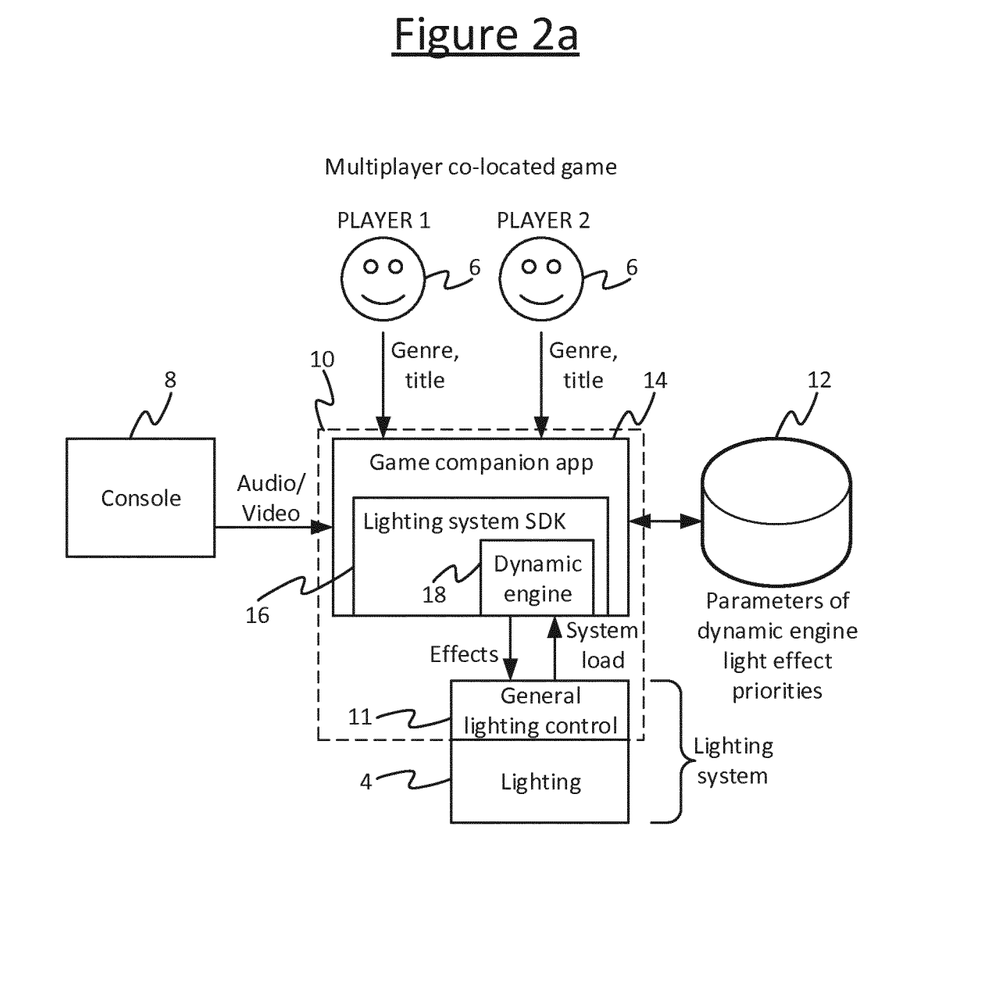
FIG. 2a is a schematic block diagram of a lighting system and multiplayer gaming system.
Figure 2B:
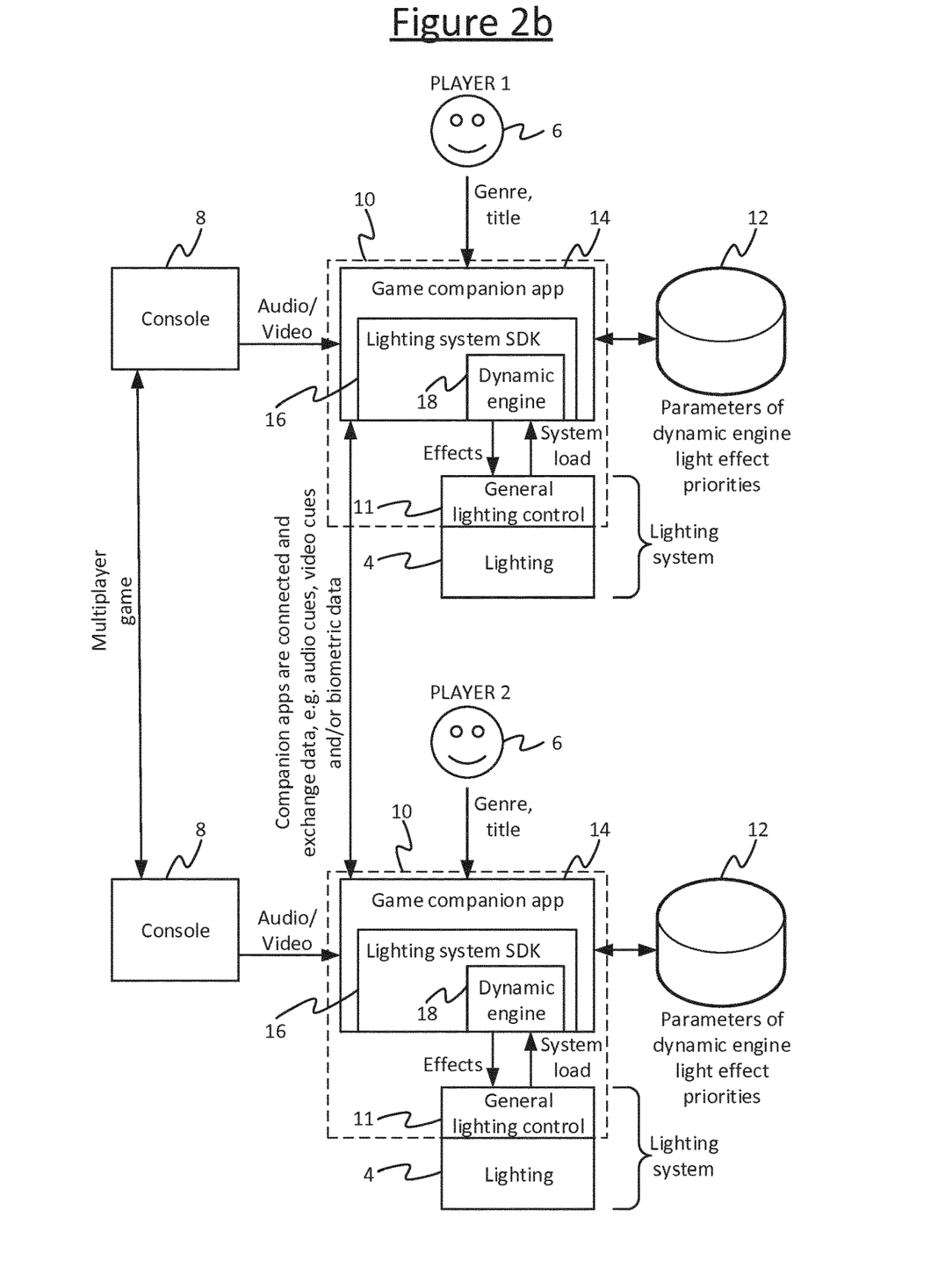
FIG. 2b is a schematic block diagram of a lighting system and multiplayer gaming system with remote participation.

FIG. 2a illustrates a variant of FIG. 2 which, in defining and detecting events, takes into account inputs such as biometric information from multiple local players in the same environment 2 one another and the same environment 2 as the illumination being controlled by the disclosed process. FIG. 2b illustrates an a variant of FIG. 2 which, in defining and detecting events, takes into account inputs such as biometric information from a local player in the same environment 2 as the illumination and a remote player who is joining the game from a remote location outside said environment, e.g. via the Internet.

Thus when a video game is played collaboratively or competitively, the lights 4 can be affected by the biometric data of some or all of multiple players, where for example the system looks at similarity or differences between the heart rates. Also during the multiplayer game, for example team based games, the light in the room 2 of one player can be affected by parameters that are picked up at another one or more other players' location location(s).

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other

The invention claimed is:

1. An apparatus comprising a game lighting controller for controlling illumination emitted by one or more luminaires of a lighting system to accompany video games played in an environment illuminated by the illumination from said one or more luminaires; wherein the game lighting controller is configured to perform operations of:
    detecting in real-time implicit triggers in the video games using a first sensor, the detection of each of the implicit triggers being based on analyzing audio and/or video content output during gameplay and/or an effect on one or more players invoked by the audio and/or video content during gameplay, wherein each of the implicit triggers corresponds to a respective one of a set of predefined event types;
    based on detecting a first one of said implicit triggers in a first one of the video games, identifying a first event occurring within the first video game as being of a first one of said predefined event types;
    reading first metadata associated with the first video game, the first metadata specifying a classification of the first video game from amongst a set of predefined classifications;
    based on said identification of the first event as being of said first predefined event type, and in dependence on the classification of the first video game as specified in the first metadata, controlling the illumination emitted by the one or more luminaires to produce a first lighting effect to accompany the first event during gameplay of the first video game,
    based on detecting a further instance of the first implicit trigger in a second one of the video games, identifying a second event occurring within the second video game as being of the first predefined event type;
    reading second metadata associated with the second video game, the second metadata specifying a classification of the second video game from amongst said set of predefined classifications, the classification of the second video game being different from the classification of the first video game;
    based on said identification of the second event as being of the first predefined event type, and in dependence on the classification of the second video game as specified in the second metadata being different than the classification of the first video game, controlling the illumination emitted by the one or more luminaires to produce a second lighting effect to accompany the occurrence of the second event during gameplay of the second video game, wherein the second lighting effect is visibly distinct from the first lighting effect.

2. The apparatus of claim 1, wherein the game lighting controller is further configured to perform operations of:
    based on detecting a further instance of the first implicit trigger in a third one of the video games, identifying a third event occurring within the third video game as being of the first predefined event type;
    reading third metadata associated with the third video game, the third metadata specifying a classification of the third video game from amongst said set of predefined classifications, the classification of the third video game being the same as the first video game;
    based on said identification of the third event as being of the first predefined event type, and on the classification of the third video game as specified in the third metadata being the same as the classification of the first video game, controlling the illumination emitted by the one or more luminaires to reproduce the first lighting effect to accompany the occurrence of the third event during gameplay of the third video game, wherein the reproduction of the first light effect to accompany the third event in the third video game is the same as the first effect as accompanying the first event in the first video game.

3. The apparatus of claim 1, wherein the classification is a genre.

4. The apparatus of claim 1, wherein the classification is a particular title or a game series.

5. The apparatus of claim 1, wherein the set of predefined event types comprises any one or more of the following types:
    an explosion,
    gunfire,
    a fire,
    a crash between vehicles,
    a crash between at least one vehicle and another object,
    presence of an enemy,
    a player or players taking damage,
    a player or players increasing in health,
    a player or players inflicting damage,
    a player or players losing points,
    a player or players gaining points,
    a player or players reaching a finish line,
    a player or players completing a task,
    a player or players completing a level,
    a player or players completing a stage within a level,
    a player or players achieving a high score, and/or
    a player or players entering a certain game region; and
    wherein the first predefined event type comprises one of said one or more event types.

6. The apparatus of claim 1, wherein the second lighting effect comprises any one or more of:
    a higher intensity than the first lighting effect,
    a different colour than the first lighting effect,
    a faster speed of flashing or pulsing than the first lighting effect,
    a longer duration than the first lighting effect,
    a less uniform spatial pattern than the first lighting effect,
    use of a greater number of the luminaires than the first lighting effect, and/or an effect beginning earlier or later than the first lighting effect.

7. The apparatus of claim 1, wherein the game lighting controller is configured to read the first, second and/or third metadata from:
    a game file of the first, second and/or third video game, respectively; and/or
    a user input.

8. The apparatus of claim 1, wherein the game lighting controller is further configured to perform said analysis of the audio and/or video content based on:
    reading the video content from a payload of a video data stream,
    and/or
    reading the audio content from a payload of an audio data stream.

9. The apparatus of claim 1, wherein the game lighting controller is configured to perform said analysis in real-time as the audio and/or video content is being output during gameplay.

10. The apparatus of claim 1, wherein the game lighting controller is configured to perform said detection of one or more of the implicit triggers, including at least the first implicit trigger, at least based on analyzing the audio content during gameplay.

11. The apparatus of claim 1, wherein the game lighting controller is configured to perform said detection of one or more of the implicit triggers, including at least the first implicit trigger, based on analyzing a biometric effect on the player invoked by the content during gameplay, wherein the biometric effect comprises any one or more of:
  a heartrate of at least one of the one or more players,
  an amount of perspiration excreted by at least one of the one or more players,
  and/or
  an external temperature of at least one of the one or more players or amount of heat given off by at least one of the one or more players.

12. The apparatus of claim 1, wherein the game lighting controller is configured to determine priority assigned to each of the event types; such that if a plurality of events are identified as occurring within a window of time and the one or more luminaires are incapable of rendering lighting effects to accompany all of the plurality of events within said window, the game lighting controller prioritizes the rendering of the effects accompanying one or more of the plurality of events having a higher priority relative to one or more others of the plurality of events having a lower priority.

13. The apparatus of claim 1, wherein the first sensor is a camera, an image sensor, a microphone, a biometric sensor, a motion sensor, or a physical sensor for detection of inputs from one or more gaming equipment.

14. The apparatus of claim 1 further comprising a second sensor.

15. The apparatus of claim 14 wherein the first sensor and the second sensor are different.

16. A computer program product for controlling illumination emitted by one or more luminaires of a lighting system to accompany video games played in an environment illuminated by the illumination from said one or more luminaires; wherein the computer program product comprises code embodied on a computer-readable storage medium and configured so as when run on one or more control devices to perform operations of:
  detecting in real-time implicit triggers in the video games using a first sensor, the detection of each of the implicit triggers being based on analyzing audio and/or video content output during gameplay and/or an effect on one or more players invoked by the audio and/or video content during gameplay, wherein each of the implicit triggers corresponds to a respective one of a set of predefined event types;
  based on detecting a first one of said implicit triggers in a first one of the video games, identifying a first event occurring within the first video game as being of a first one of said predefined event types;
  reading first metadata associated with the first video game, the first metadata specifying a classification of the first video game from amongst a set of predefined classifications;
  based on said identification of the first event as being of said first identified type, and in dependence on the classification of the first video game as specified in the first metadata, controlling the illumination emitted by the one or more luminaires to produce a first lighting effect to accompany the first event during gameplay of the first video game;
  based on detecting a further instance of the first implicit trigger in a second one of the video games, identifying a second event occurring within the second video game as being of the first predefined event type;
  reading second metadata associated with the second video game, the second metadata specifying a classification of the second video game from amongst said set of predefined classifications, the classification of the second video game being different from the classification of the first video game;
  based on said identification of the second event as being of the first predefined event type, and on the classification of the second video game as specified in the second metadata being different than the classification of the first video game, controlling the illumination emitted by the one or more luminaires to produce a second lighting effect to accompany the occurrence of the second event during gameplay of the second video game, wherein the second lighting effect is visibly distinct from the first lighting effect.

17. A method of controlling illumination emitted by one or more luminaires of a lighting system to accompany video games played in an environment illuminated by the illumination from said one or more luminaires; wherein the method comprises:
  detecting in real-time implicit triggers in the video games using a payload from a video or audio stream, the detection of each of the implicit triggers being based on analyzing audio and/or video content output during gameplay and/or an effect on one or more players invoked by the audio and/or video content during gameplay,
  wherein each of the implicit triggers corresponds to a respective one of a set of predefined event types;
  based on detecting a first one of said implicit triggers in a first one of the video games, identifying a first event occurring within the first video game as being of a first one of said predefined event types;
  reading first metadata associated with the first video game, the first metadata specifying a classification of the first video game from amongst a set of predefined classifications;
  based on said identification of the first event as being of said first identified type, and in dependence on the classification of the first video game as specified in the first metadata, controlling the illumination emitted by the one or more luminaires to produce a first lighting effect to accompany the first event during gameplay of the first video game;
  based on detecting a further instance of the first implicit trigger in a second one of the video games, identifying a second event occurring within the second video game as being of the first predefined event type;
  reading second metadata associated with the second video game, the second metadata specifying a classification of the second video game from amongst said set of predefined classifications, the classification of the second video game being different from the classification of the first video game;
  based on said identification of the second event as being of the first predefined event type, and on the classification of the second video game as specified in the second metadata being different than the classification of the first video game, controlling the illumination emitted by the one or more luminaires to produce a second lighting effect to accompany the occurrence of the second event during gameplay of the second video game, wherein the second lighting effect is visibly distinct from the first lighting effect.

18. The method of claim 17, wherein said analysis of the audio and/or video content is performed based on:
   reading the video content from a payload of a video data stream,
   and/or
   reading the audio content from a payload of an audio data stream.

\* \* \* \* \*